United States Patent [19]

Vogl et al.

[11] Patent Number: 5,315,648
[45] Date of Patent: May 24, 1994

[54] RETAINER MEMBER FOR ANCHORING A TELEPHONE HANDSET TO A TELEPHONE HOUSING

[76] Inventors: Allen W. Vogl, 642 Tulane Ave., Melbourne, Fla. 32901; John H. MacNeill, 1320 S. Riverside Dr., Indialantic, Fla. 32903

[21] Appl. No.: 987,810

[22] Filed: Dec. 9, 1992

[51] Int. Cl.$^5$ .................................. H04M 1/00
[52] U.S. Cl. ................................. 379/438; 379/437
[58] Field of Search ............ 379/457, 437, 453, 438, 379/428, 451; 174/65 R; 439/449

[56] References Cited

U.S. PATENT DOCUMENTS

Re. 33,647  7/1991  Arzounian ..................... 379/433
4,518,830  5/1985  Drexler et al. ................. 379/438

Primary Examiner—James L. Dwyer
Assistant Examiner—Jack Chiang
Attorney, Agent, or Firm—Evenson, McKeown, Edwards & Lenahan

[57] ABSTRACT

A retainer member uses a simply curved surface to engage the yoke-receiver handset juncture. The retainer member includes a top portion which matches the handset receiver circuitry and includes end portions that engage the substantially circular receiver portion of the handset to provide a further distribution of applied forces. The top portion of the retainer member is provided with an end plug bore or opening having a top surface to prevent the end plug from becoming dislocated within the receiver portion. Also, a separate telephone wire channel is provided to keep separate the telephone wires from the flexible stranded cable thus insuring that no damage will occur to the telephone signal wires when the handset is subsequently stressed.

11 Claims, 3 Drawing Sheets

RETAINER MEMBER FOR ANCHORING A TELEPHONE HANDSET TO A TELEPHONE HOUSING

FIELD OF THE INVENTION

The present invention relates to the anchoring of a telephone handset to a telephone housing and, more particularly, to a retainer member arranged inside the receiver portion of the telephone handset used to secure the handset to the housing through a flexible stranded cable.

BACKGROUND OF THE INVENTION

Anchoring systems are generally known in which a stranded flexible cable having a tensile strength exceeding 800 lbs. is used to mechanically connect the handset to the housing. The stranded cable together with the telephone signal wires are sheathed in a flexible telephone cord armor between the handset and the housing. The stranded cable extends through the yoke of the handset past the junction of the yoke and handset receiver portion. The end of the stranded cable is provided with an end plug or stop. The known prior retainer members have been either wedge-shaped to engage the yoke receiver junction or of a curved compound surface which matches the shape of the yoke-receiver junction. In each of these retainers, there is provided a pocket in which the end plug seats when the stranded cable is stressed.

The prior art retainer members suffer from numerous disadvantages. The wedge-shaped retainer member exerts forces against the interior of the handset which are greater than the force in the stranded cable in accordance with the principle of the inclined plane. The forces are applied where the handset is weak and are not aligned with the applied force. Therefore, while a wedge-shaped surface is simple and relatively inexpensive to produce, it allows the handset to rupture and perhaps injure the user. Alternatively, the compound curved surface retainer members are formed so as to closely match the interior surface of the yoke-receiver portion of the handset so as to distribute the forces over a large surface area when the handset is pulled away from the housing. These devices thus require the machining of a compound convex/concave tool surface which is expensive.

Still further, a problem with the known prior art retainer members is that the end plug, which under stress rests within the pocket provided in the retainer member, can be displaced from the pocket when the handset is not under stress or alternately is compressed toward the housing. In this case, the end plug interferes with the handset receiver and can cause damage to the receiver and telephone wires. This is especially true when a displaced end plug is subsequently placed under stress and entangles the telephone wires or the receiver terminals. In this case, the wires can be crimped, shorted or otherwise damaged.

There is therefore needed a retainer member which provides sufficient tensile strength for anchoring the handset to the housing and yet is economical to produce and avoids the known problems with the prior art devices.

SUMMARY OF THE INVENTION

These needs are met by the retainer member according to the present invention which uses a simply curved surface to engage the yoke-receiver handset juncture. Further, the retainer member includes a top portion which matches the handset receiver and circuitry and includes end portions that engage projections within the substantially circular receiver portion of the handset to provide a further distribution of applied forces. The top portion of the retainer member according to the present invention is further provided with an end plug pocket having a top or lid surface to prevent the end plug from becoming dislocated within the receiver portion. Also, a separate telephone wire channel is provided to keep separate the telephone wires from the flexible stranded cable thus insuring that no damage will occur to the telephone signal wires when the handset is subsequently stressed.

Other objects, advantages and novel features of the present invention will become apparent from the following detailed description of the invention when considered in conjunction with the accompanying drawings.

DETAILED DESCRIPTION OF THE DRAWINGS

Figure 1:
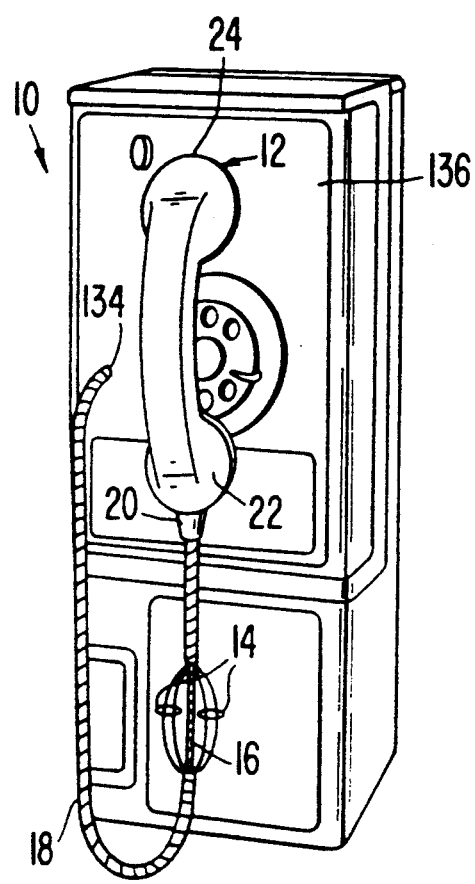
FIG. 1 is a perspective view of a public or "paystation" telephone housing and handset.

Referring to FIG. 1, there is shown a telephone housing 10 of the public or "paystation" type. The telephone housing 10 is connected to a conventional telephone handset 12 through telephone signal wires indicated at 14. These signal wires 14 are sheathed in a flexible telephone cord armor 18 between the handset 12 and the housing 10. A stranded cable 16 is also sheathed in the telephone cord armor 18 to anchor the handset to the telephone housing 10. Each end of the stranded cable 16 includes an end plug or stop 15 (FIG. 6) which is secured within a retainer at both the housing 10 and handset ends.

Typically, the stranded cable is approximately a 3/32 inch diameter 7×19 stranded cable having a tensile strength of greater than 800 lbs. to mechanically secure the handset to the housing. At the handset 12 end, the retainer for the stranded cable 16 is located in the receiver portion 24 of the handset 12 as will be shown with respect to FIGS. 2–6.

Figure 3:
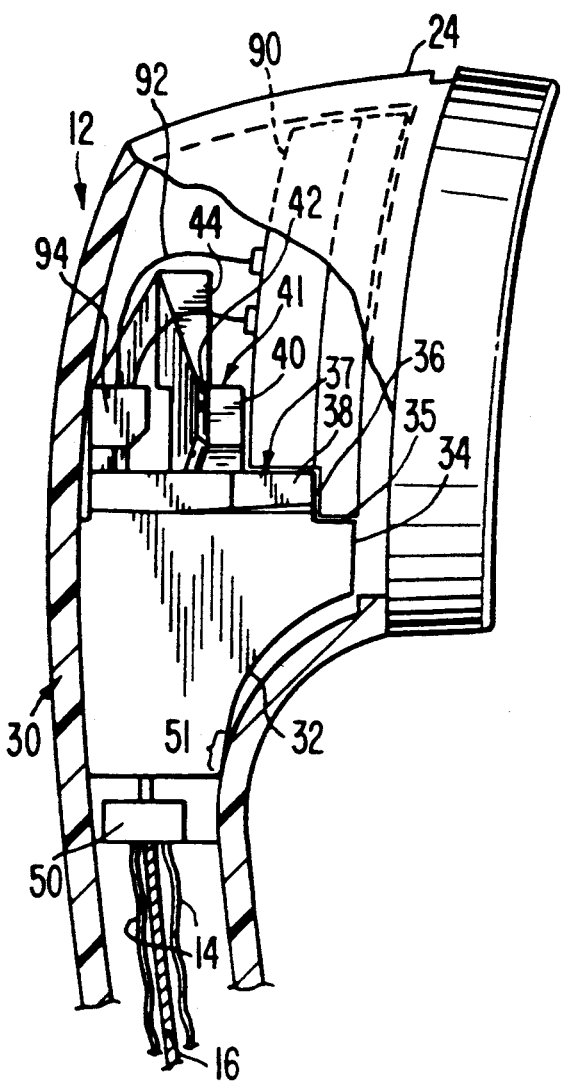
FIG. 3 is a partial side view and center-line cross-section of the handset with the retainer member of FIG. 2 installed.
Figure 2:
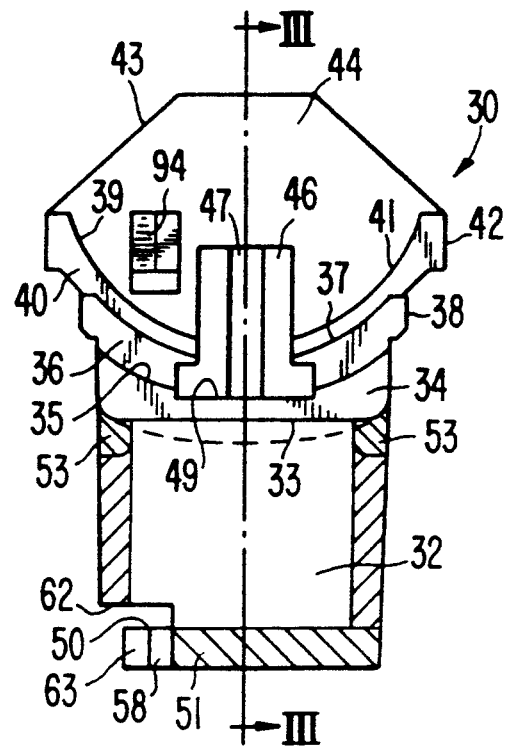
FIG. 2 is a front view of a retainer member according to the present invention.

In FIG. 2, there is shown a retainer member 30 which is located in the receiver portion 24 of the telephone handset 12 (FIG. 3). The retainer 30 includes a front surface 32 which is curved from its bottom portion to the top portion as best seen in FIG. 3. The curved front surface 32 terminates at the straight edge 33 into a first upper surface 34. The first upper surface 34 has a curved portion 35 for helping to support a receiver module 90 (FIG. 3) that is located in the handset. The first upper surface 34 leads in a stepwise manner into a second upper surface 36. This upper surface 36 includes end portions 38 which engage portions of the handset housing 12 as can be see from FIG. 6. The upper surface 36 helps support the receiver and includes a curved portion 37. The curved portion 37 clears the curved surface of the receiver module 90. Curved portion 37 leads into a third upper surface 40 which includes end portions 42. These end portions 42 likewise engage the handset 12 in the receiver portion 24. The upper surface 40 also includes a curved portion 41 which is concentric with curved portion 37 and is provided to nest with the rear portion of the receiver module. The curved portion 41 leads into an upper back wall 44 which clears the back portion of the receiver module 90 and its circuitry 92. The upper back wall 44 is provided with an end plug opening 46. The end plug opening 46 includes a slot 47 through which the stranded cable 16 can be inserted. The end plug opening 46 is large enough to admit the end plug 15 (FIG. 6) located at the end of the stranded cable 16. The end plug opening 46 also has a flat base portion 49 against which the lower end of the end plug abuts when the handset 12 is pulled away from the housing 10.

An opening 48 is required by the molding process to form the hook 94 for retaining the telephone wires, which are lead around the upper end 43 of the retainer to the receiver.

As can be seen from FIG. 3, the retainer member 30 fits inside the receiver portion 24 of the telephone handset 12. Because FIG. 3 shows a center-line cross-sectional view through the handset and the front surface 32 of the retainer member 30, it can be seen that the front surface 32 only engages the front wall of the telephone handset 12 at its lower substantially flat portion 51. The portion 51 of the front surface 32 which engages the handset 12 is shown cross-hatched in FIG. 2. As can also be seen in FIG. 2, only the edges 53 of the front, one dimensionally curved, surface 32 engage the handset front walls when put under load. The horizontal reaction is taken by portions of the back surface 60 bearing against the inside of handset 12.

Figure 4:
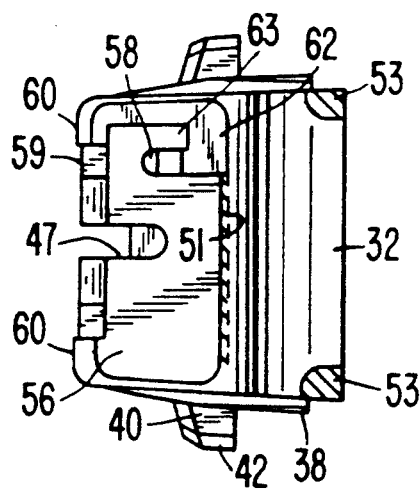
FIG. 4 is a bottom view of the retainer member according to the present invention.

Referring to FIG. 4, there is shown a bottom view of the retainer member 30. A bottom surface 56 is provided with the stranded cable slot 47 which opens to the rear end 60 of the retainer 30. This slot 47 allows the stranded cable 16 to be inserted into the retainer 30.

Also provided is a slot 58 which opens toward the front surface 32 of the retainer 30. This slot 58 is provided for the telephone wires 14. The slot 58 is formed via a hook portion 63 of the bottom surface 56. The hook portion 63 extends over a second bottom surface 62 which allows the telephone wires 14 to be held in slot 58. The slot 58 further extends toward the top of the retainer 30 via slot 59 which, like slot 47, is open toward the back surface 60 of the retainer.

Figure 5:
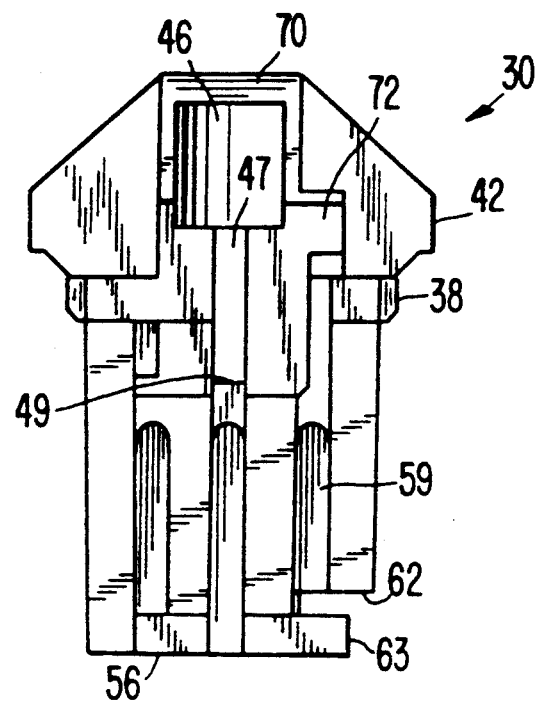
FIG. 5 is a back view of the retainer member according to the present invention.

Referring to FIG. 5, there is shown a rear view of the retainer 30. The stranded cable slot 49 extends from the bottom surface 56 of the retainer 30 upward to the pocket 46. The pocket 46 includes a top portion 70 which provides a top on the pocket 46. In this manner, when the end plug 15 of the stranded cable 16 is located in place on the retainer member 30, the end plug is constrained by the flat base portion 49 when under stress and by the top portion 70 for the opening 46 when not under stress.

The telephone wire slot 59 likewise extends from the hook portion 63 located at the lower end of the retainer 30 upward to a second hook portion 72 and 48. This hook portion is provided to secure the telephone wires 14 in the slot 59 at the top of the retainer member 30.

Figure 6:
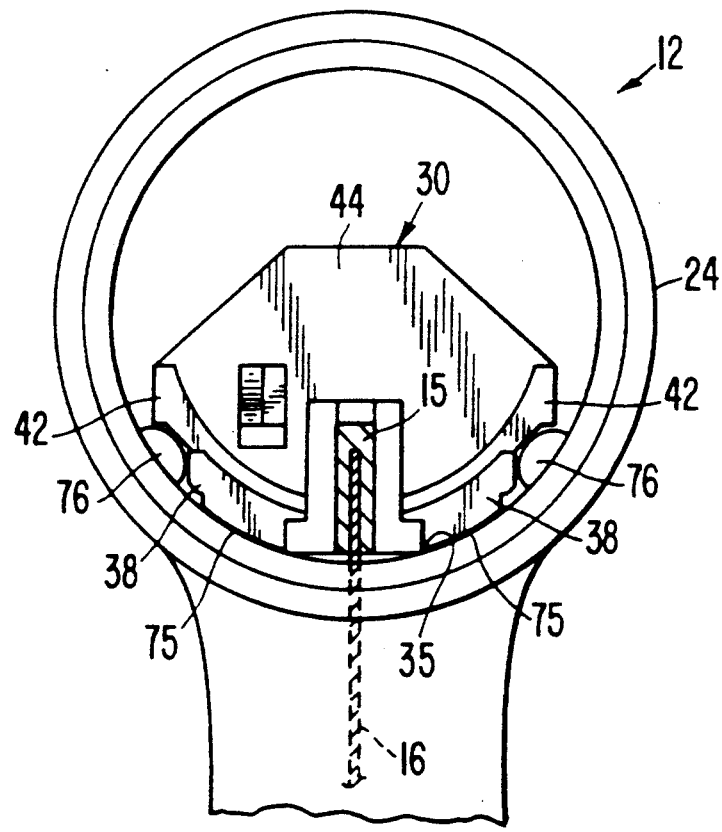
FIG. 6 is a front view of the retainer member installed within the telephone handset according to the present invention.

Referring to FIG. 6, there is shown a front view of the retainer member 30 inside the telephone handset 12. When the retainer 30 is installed, it can be seen that the end portions 38 and 42 are formed such that they engage the inner side walls of the receiver portion 24 of the handset 12. The receiver portion 24 includes extensions or protrusions 75 and 76 which mate with the end portions 38 and 42. The extensions 75 and 76 function to relieve the stress placed on the handset 12 when the stranded cable is placed under tension. The extensions are integrally molded as part of the handset receiver portion 24.

The anchoring system according to the present invention operates using the end portions 38 and 42 as well as contacting portions 51, 53 and 60 to distribute the stress placed on the handset 12 when the stranded cable 16 is placed under tension—such as by someone attempting to pull the handset away from the housing 10. By distributing the stress areas on the handset 12, the handset can withstand extremely high forces (greater than 800 lbs. of "pull"). Further, when the handset is not under stress, the opening 46 and top portion 70 function to retain the end plug 15 in its operable position should stress be subsequently applied. This eliminates the possibility of the end plug 15 being out of place within the receiver portion 24 such that damage could result when subsequently placed under stress. The top and opening ensure that the stranded cable 16 and end plug 15 are always maintained in their operable arrangement.

Further, the use of a separate telephone wire slot and fastening hooks 63 and 72 ensures the telephone wires 14 are kept separate from the anchoring cable 16. By doing so, the electrical integrity of the wires 14 is ensured and no chafing or other crimping can occur when the handset is placed under stress. This eliminates the disadvantage of prior retainers in which the telephone wires 14 could be caught near the end plug 15 such as to damage the wires when the handset is stressed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A retainer member for securing a telephone handset to a telephone housing via a cable, the handset having a yoke portion and a receiver portion connected at a yoke/receiver junction, wherein said retainer member, comprises:

a front surface curved in only one plane parallel to a longitudinal axis of the headset, allowing the retainer member to be inserted into the yoke-receiver junction such that only a bottom portion and side edges of the front surface contact an interior surface of the yoke/receiver junction, the majority of said front surface being in a non-contacting relationship with the interior surface; and a bottom surface, rear surface and a top surface portion, said top surface portion including an integral stop to prevent an end plug of said cable from extending out of the top surface of said retainer member.

2. A retainer member, according to claim 1, for securing the telephone handset to the telephone housing using the cable having the end plug, wherein said bottom and rear surfaces are provided with a first slot for receiving said cable, said first slot terminating at an end plug opening.

3. A retainer member according to claim 2, wherein said bottom and rear surfaces are provided with a second slot for receiving telephone wires to be kept separate from the cable, said bottom surface including a first hook portion and said top surface including a second hook portion to hold the telephone wires in the second slot.

4. A retainer member according to claim 1, further including:
   at least first and second concentrically curved upper surfaces arranged in a stepped manner with respect to each other, wherein a receiver module for the handset rests on the first curved upper surface; and
   a back wall extending transversely to the second curved upper surface to keep telephone wires from the cable and its end plug.

5. A retainer member according to claim 4, wherein at least one of said first and second curved upper surfaces include end portions which engage an interior surface of the receiver portion of the handset.

6. A retainer member according to claim 5, wherein the interior surface of the receiver portion is provided with integrally molded protrusions which mate with the end portions to absorb load.

7. A system for securing a telephone handset to a telephone housing, the handset having a yoke portion ad a receiver portion connected at a yoke/receiver junction, comprising:
   a retainer member having a front surface, curved in only one plane parallel to a longitudinal axis of the headset, allowing the retainer member to be inserted into the yoke/receiver junction such that only a bottom portion and two edge portions of the front surface contact an interior surface of the yoke/receiver junction, the majority of said front surface being a non-contacting relationship with the interior surface; and a bottom surface, rear surface and a top surface portion;
   a cable, one end of said cable being attached to said telephone housing and the other end having an end plug;
   wherein said bottom and rear surfaces of the retainer member are provided with a first slot for receiving said cable, said first slot terminating at an end plug opening arranged in the top surface for receiving the end plug, said opening including an integral stop to prevent the end plug from extending out of the opening opposite said first slot.

8. A system according to claim 7, wherein said bottom and rear surfaces of the retainer member are provided with a second slot for receiving telephone wires to be kept separate from the cable, said bottom surface including a first hook portion and said top portion including a second hook portion to hold the telephone wires in the second slot.

9. A system according to claim 8, wherein said retainer member includes at least first and second concentrically curved upper surfaces arranged in a stepped manner with respect to each other, wherein a receiver module, having receiver circuitry, for the handset clears the first curved upper surface; and
   a back wall extending transversely to the second curved upper surface to support the receiver circuitry.

10. A retainer member according to Claim 9, wherein at least one of said first and second curved upper surfaces include end portions which engage an interior surface of the receiver portion of the handset.

11. A retainer member according to Claim 10, wherein the interior surface of the receiver portion is provided with integrally molded protrusions which mate with the end portions to absorb load.

* * * * *